(12) United States Patent
Childs

(10) Patent No.: US 12,593,750 B2
(45) Date of Patent: Apr. 7, 2026

(54) AGRICULTURAL DISC MOWER WITH KNIFE-RETAINING SPRING PLATE

(71) Applicant: CNH Industrial America LLC, New Holland, PA (US)

(72) Inventor: Albert Childs, Meadville, PA (US)

(73) Assignee: CNH Industrial America LLC, New Holland, PA (US)

( * ) Notice: Subject to any disclaimer, the term of this patent is extended or adjusted under 35 U.S.C. 154(b) by 676 days.

(21) Appl. No.: 18/074,652

(22) Filed: Dec. 5, 2022

(65) Prior Publication Data

US 2024/0180077 A1     Jun. 6, 2024

(51) Int. Cl.
*A01D 34/73* (2006.01)

(52) U.S. Cl.
CPC ......... *A01D 34/733* (2013.01); *A01D 34/736* (2013.01)

(58) Field of Classification Search
CPC .. A01D 34/733; A01D 34/736; A01D 34/828; A01D 34/664; A01D 43/10
See application file for complete search history.

(56) References Cited

U.S. PATENT DOCUMENTS

| | | | | |
|---|---|---|---|---|
| 3,755,999 | A | * | 9/1973 | Meyer ................... A01D 34/736 |
| | | | | 56/295 |
| 3,958,402 | A | * | 5/1976 | Bouet ................... A01D 34/733 |
| | | | | 56/295 |
| 6,829,878 | B1 | | 12/2004 | Hoffman |
| 8,857,038 | B2 | | 10/2014 | Fay, II |

| | | | | |
|---|---|---|---|---|
| 2005/0193706 | A1 | * | 9/2005 | Thompson ........... A01D 34/733 |
| | | | | 56/255 |
| 2010/0101201 | A1 | | 4/2010 | Yanke |
| 2013/0055546 | A1 | * | 3/2013 | Fay, II ................. A01D 34/736 |
| | | | | 29/525.01 |
| 2013/0247530 | A1 | * | 9/2013 | Heinrich ............. A01D 34/733 |
| | | | | 56/295 |
| 2014/0126952 | A1 | | 5/2014 | Fay, II |
| 2019/0373810 | A1 | | 12/2019 | Figgins |

FOREIGN PATENT DOCUMENTS

| | | | |
|---|---|---|---|
| EP | 2 939 516 A1 | 11/2015 | |
| EP | 3120683 A1 * | 1/2017 | ........... A01D 34/736 |
| PL | 67473 Y1 | 10/2013 | |

OTHER PUBLICATIONS

Translation of Document EP 3120683 A1 as retrieved on Aug. 7, 2025 (Year: 2017).*
Extended European Search Report for EP Application No. 23214367.7 dated Apr. 23, 2024 (5 pages).

* cited by examiner

*Primary Examiner* — Joseph M Rocca
*Assistant Examiner* — Jose Antonio Martinez
(74) *Attorney, Agent, or Firm* — Buchanan Ingersoll & Rooney PC

(57) ABSTRACT

A disc cutter for an agricultural implement includes: a disc body; a knife nut coupled to the disc body; a knife including a knife opening in which the knife nut is disposed, the knife being configured to rotate about a rotation axis defined by the knife nut; and a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

20 Claims, 9 Drawing Sheets

AGRICULTURAL DISC MOWER WITH KNIFE-RETAINING SPRING PLATE

FIELD OF THE INVENTION

The present invention pertains to agricultural implements and, more specifically, to disc cutters for agricultural mowing devices.

BACKGROUND OF THE INVENTION

Mowers and mower conditioners are often employed to cut crop material, such as hay or grass, and deposit the cut crop into windrows in a field. For cutting smaller fields, a single pull-type mower or mower conditioner may be attached to the rear of an agricultural driving vehicle. For cutting large fields, the driving vehicle may push a front mounted mower or mower conditioner and optionally tow an additional rear mounted mower or mower conditioner.

A typical mower generally includes a frame, a hitch coupled to the vehicle, and a cutter bar such as a sickle bar or rotary disc cutter bar for severing the crop from the field. The mower may further include other elements such as a reel to assist crop feeding, an auger or belts to convey crop to a central discharge point, and a flail or set of rollers for conditioning crop as it is ejected rearwardly out of the mower. A disc cutter bar generally includes multiple juxtaposed cutterheads for cutting the standing crop. Each cutterhead may consist of a rotating disc with diametrically opposed cutting blades or knives affixed to the body of the disc.

The knives of a cutter bar are known wear items that are intended to be replaced or repaired with some frequency. However, many mowers have cutter bars that are structured in order to reduce the frequency of knives needing to be repaired or replaced. One known cause of irreparable knife damage is when the rotating knife contacts a large object or obstacle in a field, such as a rock. The knives typically rotate at high speeds and can be dulled, shattered, or otherwise broken when contacting the object or obstacle.

What is needed in the art is a way to reduce the frequency at which knives of a cutter bar need to be replaced or repaired.

SUMMARY OF THE INVENTION

Exemplary embodiments disclosed herein provide disc cutters with a knife and a spring plate carrying at least two protrusions such that in a first position the spring plate bears on the knife so a plane defined through a portion of the knife extends through the protrusions until an overload force applied to the knife forces the knife over at least one of the protrusions and moves the spring plate to a second position.

In some exemplary embodiments provided according to the present disclosure, a disc cutter for an agricultural implement includes: a disc body; a knife nut coupled to the disc body; a knife including a knife opening in which the knife nut is disposed, the knife being configured to rotate about a rotation axis defined by the knife nut; and a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

In some exemplary embodiments provided according to the present disclosure, a cutter bar for an agricultural implement includes a frame and a plurality of disc cutters carried by the frame. At least one of the disc cutters includes: a disc body including a disc opening; a bolt disposed in the disc opening; a knife nut including a nut opening in which the bolt is disposed; a knife including a knife opening in which the knife nut is disposed, the knife being configured to rotate about a rotation axis defined by the knife nut; and a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

In some exemplary embodiments provided according to the present disclosure, an agricultural mowing assembly includes an agricultural vehicle and an agricultural implement coupled to the agricultural vehicle. The agricultural implement has a cutter bar that includes a frame and a plurality of disc cutters carried by the frame. At least one of the disc cutters includes: a disc body including a disc opening; a bolt disposed in the disc opening; a knife nut including a nut opening in which the bolt is disposed; a knife including a knife opening in which the knife nut is disposed, the knife being configured to rotate about a rotation axis defined by the knife nut; and a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

One advantage that may be realized by exemplary embodiments provided according to the present disclosure is that the protrusions can hold the knife in a fixed cutting position until the knife contacts an object, causing the knife to swing to a swung-in position and reduce the risk of the knife breaking.

Another advantage that may be realized by exemplary embodiments provided according to the present disclosure is that the knife can automatically move back into the cutting position between the protrusions due to the centrifugal force that arises as the knife rotates.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." As used herein, the term "mowing device" may refer to any agricultural cutting device that severs crop from the field, including a mower, a mower conditioner, or a cutter bar for a forage harvester or combine.

Figure 1:
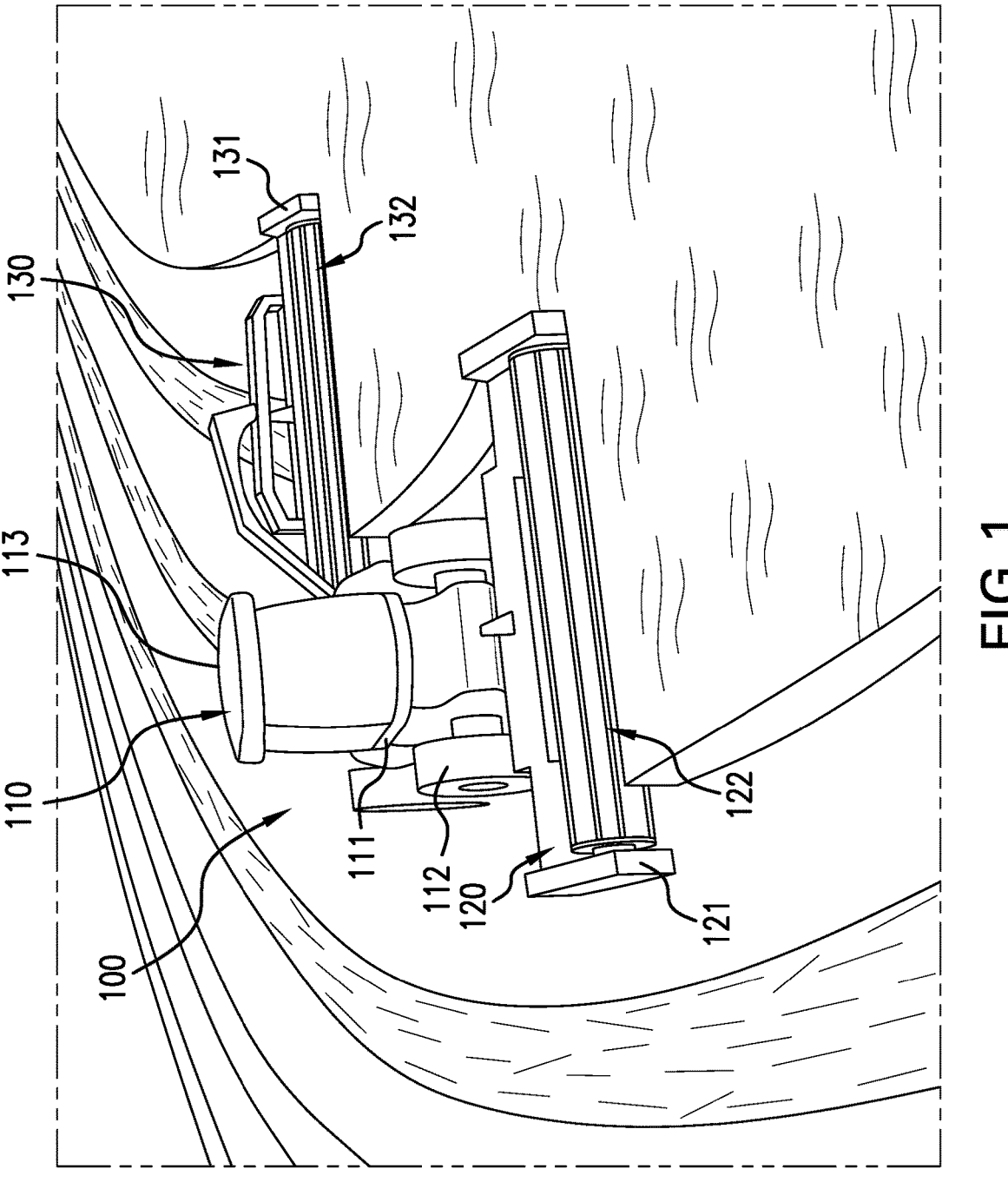
FIG. 1 illustrates a perspective view of an exemplary embodiment of an agricultural mowing assembly including an agricultural vehicle and an agricultural implement provided according to the present disclosure.
Figure 2:
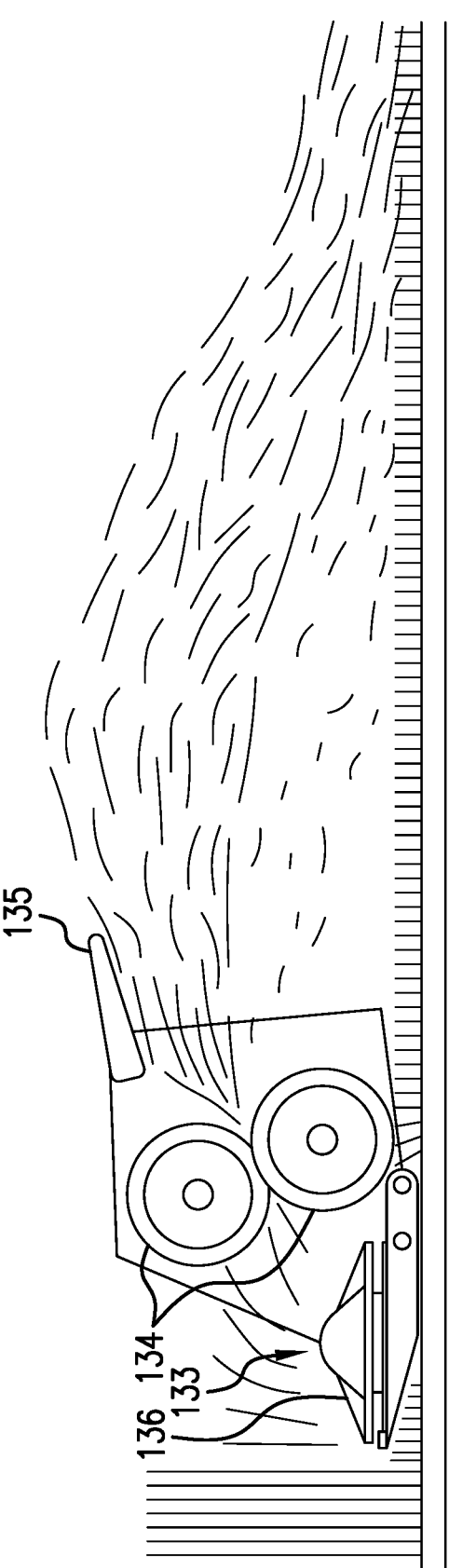
FIG. 2 illustrates a side sectional view of the agricultural implement of FIG. 1.

Referring now to the drawings, and more particularly to FIGS. 1-2, there is shown an agricultural mowing assembly 100 which includes an agricultural vehicle 110 and at least one agricultural implement illustrated in the form of two mowing devices 120, 130 coupled to the agricultural vehicle 110. The agricultural mowing assembly 100 may include tandem front and rear mowing devices 120, 130, which operate in tandem to cut crop from the field. It should be appreciated that while only two mowers 120, 130 are illustrated and described herein, the present disclosure is equally applicable to mowing assemblies that incorporate only one mowing device or more than two mowing devices.

The agricultural vehicle 110 generally includes a chassis 111, a prime mover, wheels and/or tracks 112, and a cab 113 for housing the operator. The chassis 111 may at least partially carry the front and rear mowing devices 120, 130. The vehicle 110 can be in the form of a tractor, self-propelled windrower, or any other desired agricultural vehicle.

The front and rear mowing devices 120, 130 are connected to the chassis 111 of the agricultural vehicle 110. The front mowing device 120, for example, may be centrally mounted onto the driving vehicle 110 such that the agricultural vehicle 110 carries the front mowing device 120. The rear mowing device 130 may be coupled to a tongue coupler on the chassis 111 by a pivotable tongue that can change the angular position of the rear mowing device 130 relative to the forward direction of travel. As shown, the mowing devices 120, 130 are in the form of mower conditioners; however, the mowing devices 120, 130 can be in the form of any desired mowing devices such as mowers, windrowers, cutter bars, or windrow inverters. Each mowing device 120, 130 may include a frame 121, 131, a reel 122, 132 with tines rotatably connected to the frame 121, 131, a cutter bar 133, a conditioner 134, e.g. at least one flail conditioner or at least two conditioning rollers 134, and/or a crop gate 135, e.g. swath gate and/or windrow forming shields, for directing the crop material out of the mowing device 120, 130 and onto the field in a windrow or swath (as shown in FIG. 2 with respect to the rear mowing device 130). The illustrated cutter bar 133 is in the form of a rotary disc cutter bar 133 with multiple disc cutters 136 carried by a frame of the cutter bar 133.

Figure 3:
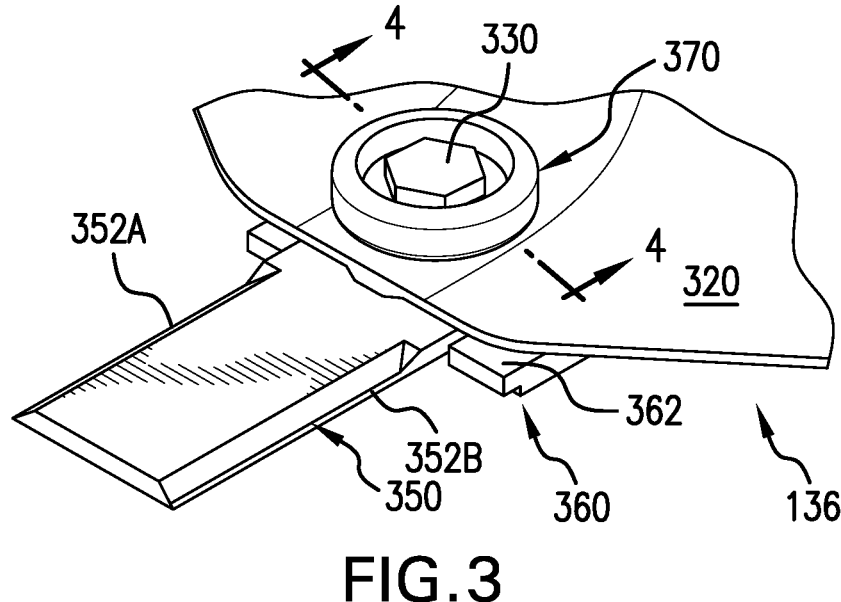
FIG. 3 illustrates a perspective view of an exemplary embodiment of a disc cutter provided according to the invention including a knife in a cutting position and a spring plate in a first position.
Figure 4:
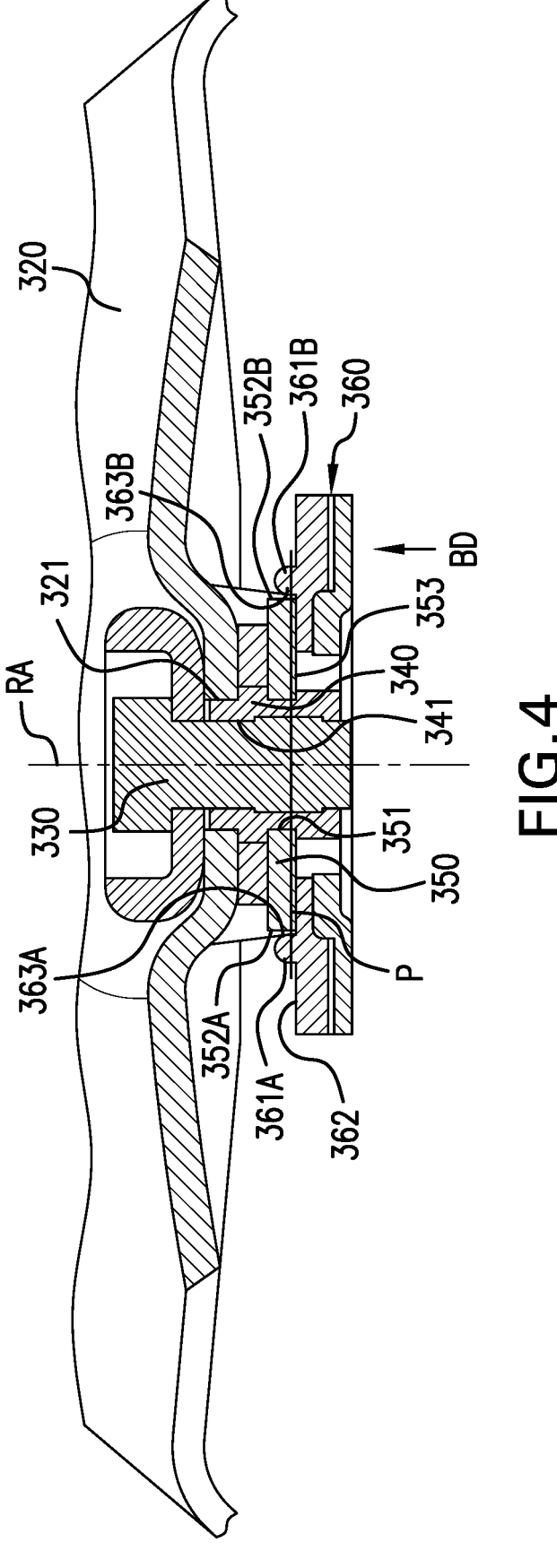
FIG. 4 illustrates a cross-sectional view of the disc cutter of FIG. 3 taken along line 4-4.

Referring now to FIGS. 3-4, one of the disc cutters 136 is illustrated. The disc cutter 136 includes a disc body 320, a knife nut 340 coupled to the disc body 320, a knife 350 having a knife opening 351 in which the knife nut 340 is disposed, and a spring plate 360. To couple the knife nut 340 to the disc body 320, the disc body 320 may have a disc opening 321 formed therein and a bolt 330 disposed in the disc opening 321 of the disc body 320 and a nut opening 341 of the knife nut 340, but it should be appreciated that this is exemplary only and the knife nut 340 may be coupled to the disc body 320 in other ways. When the bolt 330 is included, a bolt shield 370 may also be included to protect the bolt 330 from damage during operation. The knife 350 is configured to rotate about a rotation axis RA defined by the knife nut 340, allowing the knife 350 to rotate between a cutting position (illustrated in FIGS. 3-6 and 9) and a swung-in position (illustrated in FIGS. 7-8), as will be described further herein. The spring plate 360 is biased in a biasing direction BD upwards towards the disc body 320 and bears on the knife 350. The spring plate 360 may be biased in the biasing direction BD by virtue of, for example, being formed of a deformable material such as spring steel and loaded in a manner that biases the spring plate 360 in the biasing direction BD.

Figure 5:
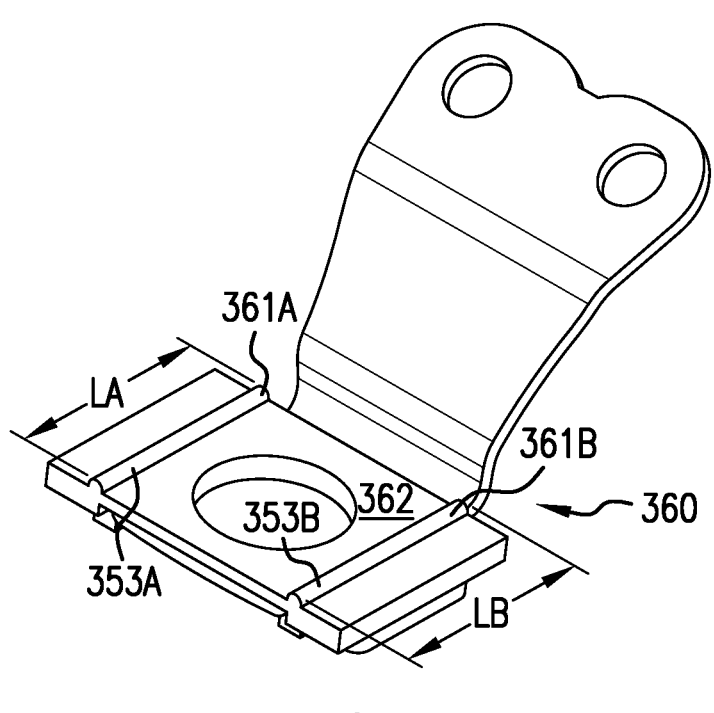
FIG. 5 illustrates a perspective view of the spring plate of FIG. 4 separate from the disc cutter.

Referring specifically now to FIG. 4, and FIG. 5 as well, it can be seen that the spring plate 360 carries at least two protrusions, illustrated as a pair of protrusions 361A, 361B. The spring plate 360 is movable between a first position (illustrated in FIGS. 3-6 and 9) and a second position (illustrated in FIGS. 7-8). In the first position, the spring plate 360 bears on the knife 350 such that a plane P defined through a portion of the knife 350 extends through the protrusions 361A, 361B. The plane P may extend, for example, through two opposite edges of each of the protrusions 361A, 361B. In this respect, the knife 350 can be held between the protrusions 361A, 361B when the spring plate 360 is in the first position to keep the knife 350 in the cutting position.

Figure 6:
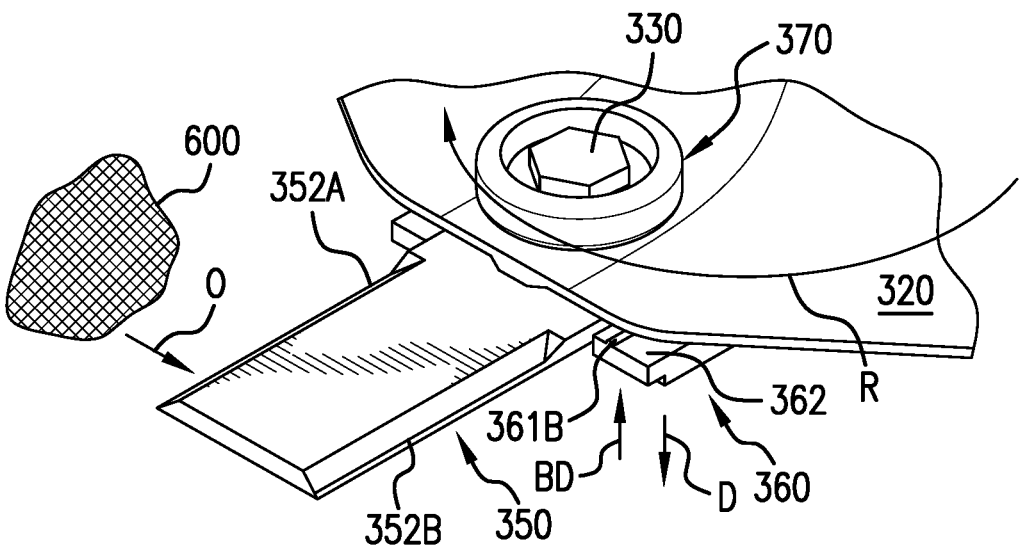
FIG. 6 illustrates the disc cutter of FIGS. 3-4 as the knife rotates towards an object.
Figure 7:
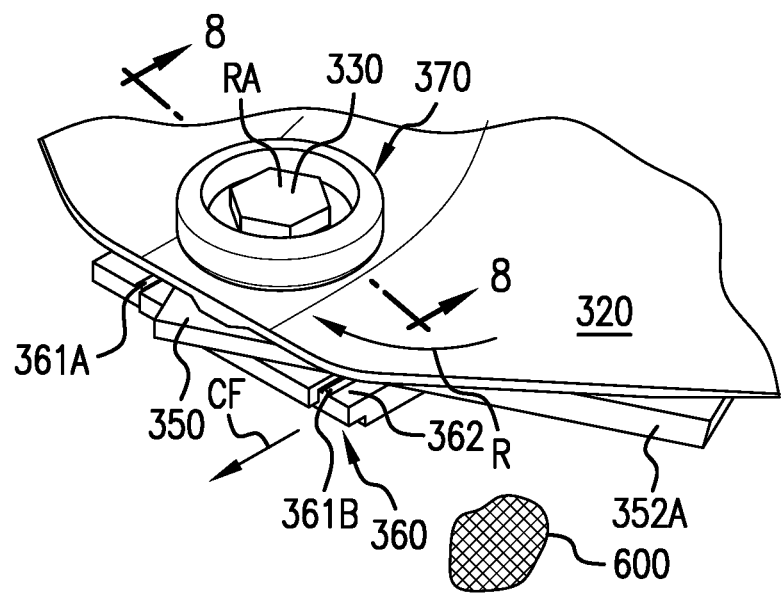
FIG. 7 illustrates a perspective view of the disc cutter of FIGS. 3-6 after the knife has moved to a swung-in position and the spring plate is in a second position.
Figure 8:
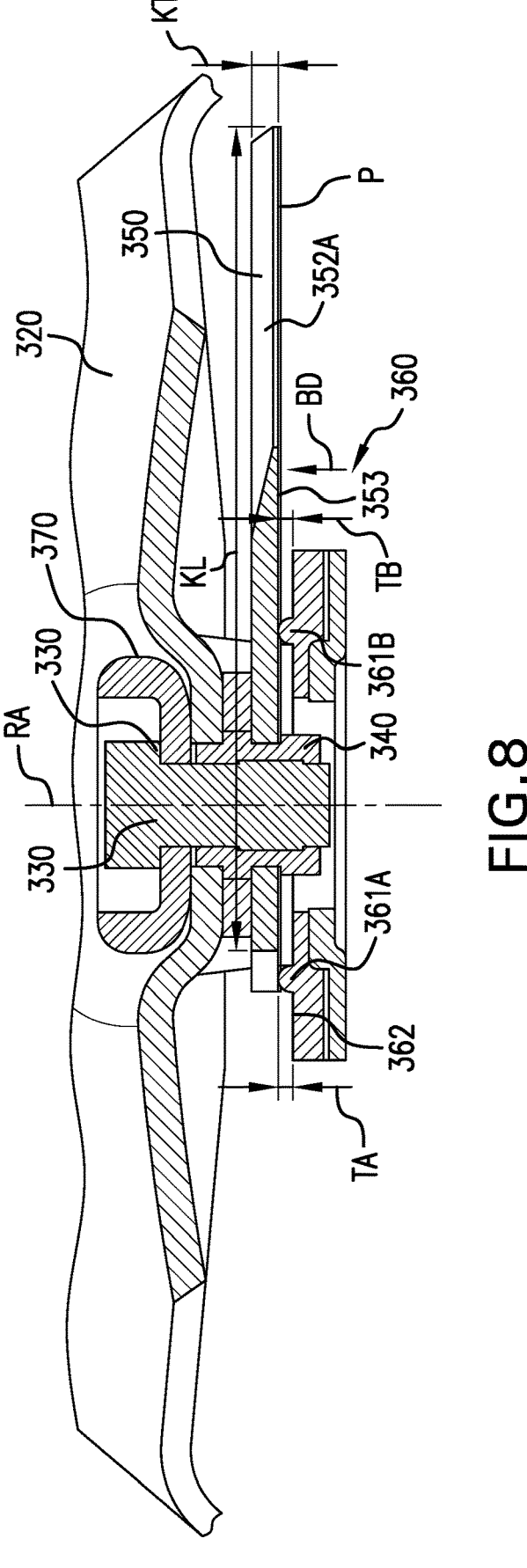
FIG. 8 illustrates a cross-sectional view of the disc cutter of FIG. 7 taken along line 8-8.

FIGS. 6-8 illustrate what happens when the knife 350 is rotated in a rotation direction R towards an object 600. Once the knife 350 contacts the object 600, an overload force O is applied to the knife 350. The overload force O applied to the knife 350 forces the knife 350 over one or more of the protrusions 361A, 361B, which is best illustrated in FIGS. 7-8. The knife 350 being forced over the protrusion(s) 361A, 361B causes the spring plate 360 to move to the second position, i.e., in a direction D opposite to the biasing direction BD in the illustrated embodiment. When the spring plate 360 is in the second position, the knife 350 may be in the swung-in position so the plane P extending through the knife 350 no longer extends through the protrusions 361A, 361B. In this respect, the protrusions 361A, 361B do not impede lateral or side-to-side movement of the knife 350 when the spring plate 360 is in the second position but do act against the knife 350 in the biasing direction BD to keep the knife 350 from translating vertically out of its operation plane. While the knife 350 may not be able to cut crop material in the swung-in position, the overload force O e.g., when contacting the object 600, causing movement of the knife 350 from the cutting position to the swung-in position reduces the risk of the knife 350 being substantially damage because the overload force O causes movement of the knife 350 rather than the material of the knife 350 entirely absorbing the overload force O and deforming. Therefore, the knife 350 being forced over at least one of the protrusions 361A, 361B reduces the risk that the knife 350 dulls, shatters, or breaks when contacting the object 600. The spring plate 360 with the protrusions 361A, 361B also reduces the risk of the knife 350 moving outside of the operational plane or zone and striking and damaging other components of the disc cutter 136.

The protrusions 361A, 361B may be carried by the spring plate 360 in a variety of ways. In some embodiments, the knife 350 includes a pair of opposite edges 352A, 352B and at least one of the protrusions 361A, 361B bears on a respective one of the edges 352A, 352B when the spring plate 360 is in the first position. When the spring plate 360 is in the second position, one or both of the protrusions 361A, 361B may come out of contact with the edge 352A, 352B of the knife 350 that the protrusion(s) 361A, 361B contacts when the spring plate 360 is in the first position. In some embodiments, both of the protrusions 361A, 361B contacts a respective edge 352A, 352B of the knife 350 when the spring plate 360 is in the first position. Having the protrusion(s) 361A, 361B contact a corresponding edge 352A, 352B of the knife 350 helps the protrusion(s) 361A, 361B stabilize the knife 350 so the knife 350 does not spontaneously rotate about the rotation axis RA during normal operation of the disc cutter 136.

In some embodiments, the spring plate 360 includes a bearing surface 362 that bears on a surface 353 of the knife 350 in the first position and is out of contact with the knife 350 when the spring plate 360 is in the second position, as can be appreciated from comparing FIGS. 4 and 8. When the spring plate 360 is in the second position, one or both of the protrusions 361A, 361B may bear on the surface 353 of the knife 350 rather than the bearing surface 362 so the knife 350 does not freely rotate about the rotation axis RA but must overcome the friction between the surface 353 and the protrusion(s) 361A, 361B to rotate. In some embodiments, the surface 353 is a surface of the knife 350 that does not face the disc body 320, but it should be appreciated that the surface of the knife 350 facing the disc body 320 may also be the surface of the knife 350 that the bearing surface 362 contacts when the spring plate 360 is in the first position. Each of the protrusions 361A, 361B may extend from the bearing surface 362 so the knife 350 comes out of contact with the bearing surface 362 as the knife 350 is forced over at least one of the protrusions 361A, 361B. The protrusions 361A, 361B may, for example, be molded into the bearing surface 362 so the protrusions 361A, 361B are integrally formed with the bearing surface 362. However, it should be appreciated that the protrusions 361A, 361B can be merely connected to the spring plate 360, e.g., to the bearing surface 362, so the spring plate 360 carries the protrusions 361A, 361B without the protrusions 361A, 361B being integrally formed in the spring plate 360.

As best illustrated in FIGS. 4-5 and 8, each of the protrusions 361A, 361B may be formed to include a rounded surface 363A, 363B facing the knife 350. Each of the rounded surfaces 363A, 363B may, for example, face the corresponding edge 352A, 352B of the knife 350 and contact the corresponding edge 352A, 352B when the spring plate 360 is in the first position and the knife 350 is in the cutting position. The rounded surfaces 363A, 363B may be shaped in a variety of ways to control the overload force O that causes the knife 350 to be forced over one or both of the protrusions 361A, 361B. A radius of each of the rounded surfaces 363A, 363B, for example, may be adjusted to increase or decrease the overload force O required to force the knife 350 to slide along the respective rounded surface 363A, 363B over one or both of the protrusions 361A, 361B. In some embodiments, the protrusions 361A, 361B may be formed with tapered surfaces, such as linearly tapered surfaces, rather than the rounded surfaces 363A, 363B. In such embodiments, the degree of tapering can control how much overload force O is required to force the knife 350 over the protrusion(s) 361A, 361B. It should thus be appreciated that the protrusions 361A, 361B can be shaped in a variety of ways.

Figure 9:
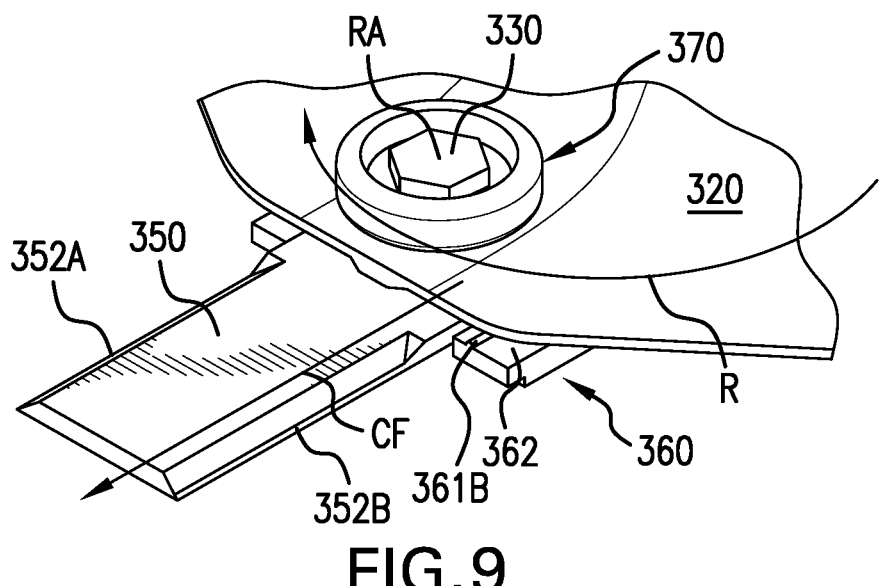
FIG. 9 illustrates the disc cutter of FIGS. 6-8 after centrifugal force from rotation has caused the knife to return to the cutting position and the spring plate to return to the first position.

Referring now to FIG. 7 and FIG. 9 specifically, it is illustrated how the knife 350 may be returned to the cutting position from the swung-in position and the spring plate 360 may be returned to the first position from the second position. As illustrated, rotation of the disc body 320 in the rotation direction R carries the knife 350 in the rotation direction R as well. As the knife 350 rotates in the rotation direction R, a centrifugal force CF acts on the knife 350. The centrifugal force CF acts on the knife 350 in a direction that tends to cause the knife 350 to pivot about the rotation axis RA back towards the cutting position from the swung-in position. As the knife 350 pivots towards the cutting position from the swung-in position, the knife 350 may slide along one or both of the protrusions 361A, 361B, with the friction between the knife 350 and the protrusion(s) 361A, 361B partially controlling how much centrifugal force CF is needed for the knife 350 to return to the cutting position. In some embodiments, the centrifugal force CF needed to return the knife 350 to the cutting position is no greater than the overload force O required to force the knife 350 over at least one of the protrusions 361A, 361B, e.g., the centrifugal force CF needed to return the knife 350 to the cutting position may be less than the overload force O. When the knife 350 returns to the cutting position from the swung-in position, the spring plate 360 may momentarily come out of contact with the knife 350 and return to the first position from the second position so the knife 350 is once again in the plane P extending between the protrusions 361A, 361B. It should thus be appreciated that the knife 350 may automatically return to the cutting position and the spring plate 360 may automatically return to the first position due to the centrifugal force CF without the need for a user to stop operation of the disc cutter 136.

In some embodiments, the protrusions 361A, 361B each define a respective protrusion length LA, LB and the knife 350 defines a knife length KL that extends in parallel with the protrusion lengths LA, LB when the spring plate 360 is in the first position. As used herein, the "length" is defined as a greatest dimension between two opposed edges of the protrusions 361A, 361B and the knife 350 and "parallel" is defined as being within 5° of completely parallel. The knife length KL may also extend in parallel with the protrusion lengths LA, LB when the knife 350 is in the cutting position but not be parallel when the knife 350 is in the swung-in position. The protrusions 361A, 361B may be provided, for example, in the shape of ribs that have a greater length LA, LB than width. However, as will be described further herein, the protrusions 361A, 361B may have shapes other than that of ribs. Each of the protrusions 361A, 361B may also define a respective protrusion thickness TA, TB and the knife 350 may define a knife thickness KT that is greater than the protrusion thickness TA, TB of each of the protrusions 361A, 361B. In some embodiments, the protrusion thicknesses TA, TB are the same. Similarly, in some embodiments the protrusions 361A, 361B have the same general shape and/or dimensions, i.e., the protrusions 361A, 361B may be substantially identical. The knife 350 having a knife thickness KT that is greater than the protrusion thicknesses TA, TB differentiates the protrusions 361A, 361B from, for example, a recess that completely holds the knife 350 therein. However, it should be appreciated that in some embodiments the protrusion thickness TA, TB of one or both of the protrusions 361A, 361B is greater than the knife thickness KT.

Figure 10:
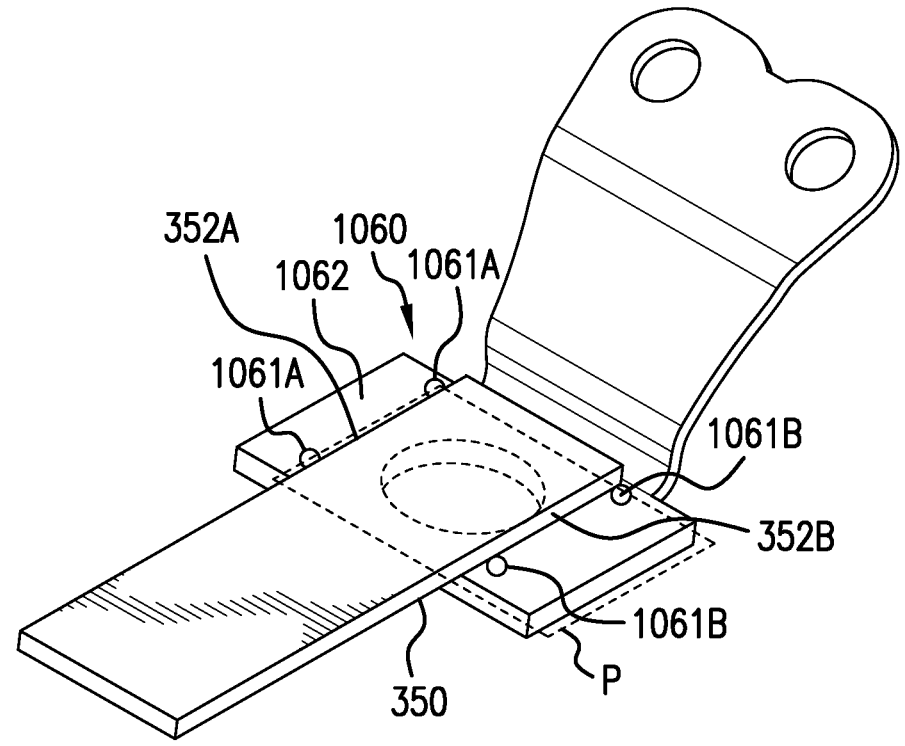
FIG. 10 illustrates a perspective view of another exemplary embodiment of a spring plate provided according to the present disclosure that carries more than two protrusions.

Referring now to FIG. 10, another exemplary embodiment of a spring plate 1060 carrying protrusions 1061 is illustrated. Unlike the previously described spring plate 360, which carried two protrusions 361A, 361B, the spring plate 1060 illustrated in FIG. 10 carries four protrusions 1061A, 1061B. As can be seen, two of the protrusions 1061A are on a first side of the knife 350 bearing on one of the edges 352A of the knife 350 and the other two protrusions 1061B are on an opposite side of the knife 350 bearing on the other edge 352B when the spring plate 1060 is in the first position where the plane P extending through the knife 350 extends through the protrusions 1061A, 1061B. When an overload force acts on the knife 350, the knife 350 is forced over one or more of the protrusions 1061A, 1061B to move the spring plate 1060 to a second position. When the spring plate 1060 is in the second position, the plane P extending through the knife 350 may not extend through the protrusions 1061A, 1061B. The protrusions 1061A, 1061B may, for example, be formed as nubs that extend from a bearing surface 1062 of the spring plate 1060. In other respects, the spring plate 1060 may be similar to the previously described spring plate 360.

From the foregoing, it should be appreciated that the spring plate 360, 1060 carrying the protrusions 361A, 361B, 1061A, 1061B provided according to the present disclosure can keep the knife 350 in a desired horizontal plane P during normal operation of the disc cutter 136. When the knife 350 contacts an object 600, the overload force O applied to the knife 350 can force the knife 350 over one or more of the protrusions 361A, 361B, 1061A, 1061B rather than the force deforming and/or breaking the knife 350. The knife 350 also tends to stay in the operating plane due to the spring plate 360, 1060 still acting on the knife 350 in the biasing direction BD even when the spring plate 360, 1060 is in the second position. The centrifugal force CF generated during rotation of the knife 350 can then return the knife 350 to the cutting position without any intervention or stoppage of the disc cutter 136. It should thus be appreciated that the spring plate 360, 1060 provided according to the present disclosure protects the knife 350 in a manner that does not substantially hinder operation of the disc cutter 136.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

8

What is claimed is:

1. A disc cutter for an agricultural implement, comprising:
a disc body;
a knife nut coupled to the disc body;
a knife comprising a knife opening in which the knife nut is disposed, the knife being configured to rotate about a rotation axis defined by the knife nut; and
a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

2. The disc cutter of claim 1, wherein the knife comprises a pair of opposite edges and at least one of the protrusions bears on a respective one of the edges when the spring plate is in the first position.

3. The disc cutter of claim 1, wherein the spring plate comprises a bearing surface that bears on a surface of the knife in the first position and is out of contact with the surface of the knife when the spring plate is in the second position.

4. The disc cutter of claim 3, wherein each of the protrusions extends from the bearing surface.

5. The disc cutter of claim 1, wherein at least one of the protrusions comprises a rounded surface facing the knife.

6. The disc cutter of claim 1, wherein the protrusions each define a respective protrusion length and the knife defines a knife length that extends in parallel with the protrusion length when the spring plate is in the first position.

7. The disc cutter of claim 1, wherein each of the protrusions defines a respective protrusion thickness and the knife defines a knife thickness that is greater than the protrusion thickness of each of the protrusions.

8. A cutter bar for an agricultural implement, comprising:
a frame; and
a plurality of disc cutters carried by the frame, at least one of the disc cutters comprising:
a disc body;
a knife nut coupled to the disc body;
a knife comprising a knife opening in which the knife nut is disposed, the knife being configured to rotate about a rotation axis defined by the knife nut; and
a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

9. The cutter bar of claim 8, wherein the knife comprises a pair of opposite edges and at least one of the protrusions bears on a respective one of the edges when the spring plate is in the first position.

10. The cutter bar of claim 8, wherein the spring plate comprises a bearing surface that bears on a surface of the knife in the first position and is out of contact with the surface of the knife when the spring plate is in the second position.

11. The cutter bar of claim 10, wherein each of the protrusions extends from the bearing surface.

12. The cutter bar of claim 8, wherein at least one of the protrusions comprises a rounded surface facing the knife.

13. The cutter bar of claim 8, wherein the protrusions each define a respective protrusion length and the knife defines a knife length that extends in parallel with the protrusion length when the spring plate is in the first position.

14. The cutter bar of claim 8, wherein each of the protrusions defines a respective protrusion thickness and the knife defines a knife thickness that is greater than the protrusion thickness of each of the protrusions.

15. An agricultural mowing assembly, comprising:

an agricultural vehicle; and an agricultural implement coupled to the agricultural vehicle, the agricultural implement comprising a cutter bar, the cutter bar comprising:

a frame; and a plurality of disc cutters carried by the frame, at least one of the disc cutters comprising:

a disc body;

a knife nut coupled to the disc body;

a knife comprising a knife opening in which the knife nut is disposed, the knife being configured to rotate about a rotation axis defined by the knife nut; and a spring plate carrying at least two protrusions, the spring plate being biased towards the disc body such that in a first position the spring plate bears on the knife so a plane defined through a portion of the knife extends through the protrusions until an overload force applied to the knife forces the knife over at least one of the protrusions and moves the spring plate to a second position.

16. The agricultural mowing assembly of claim 15, wherein the knife comprises a pair of opposite edges and at least one of the protrusions bears on a respective one of the edges when the spring plate is in the first position.

17. The agricultural mowing assembly of claim 15, wherein the spring plate comprises a bearing surface that bears on a surface of the knife in the first position and is out of contact with the surface of the knife when the spring plate is in the second position.

18. The agricultural mowing assembly of claim 17, wherein each of the protrusions extends from the bearing surface.

19. The agricultural mowing assembly of claim 15, wherein at least one of the protrusions comprises a rounded surface facing the knife.

20. The agricultural mowing assembly of claim 15, wherein each of the protrusions defines a respective protrusion thickness and the knife defines a knife thickness that is greater than the protrusion thickness of each of the protrusions.

* * * * *